(No Model.)
J. D. CALLAHAN.
AUTOMATIC VALVE FOR AIR BRAKES.
No. 431,506. Patented July 1, 1890.
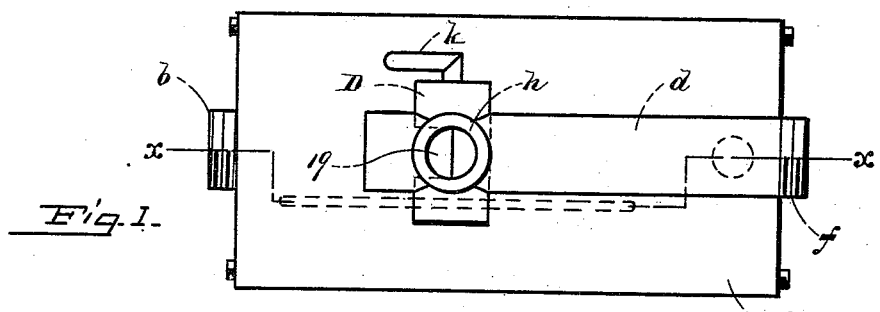
Fig. 1.
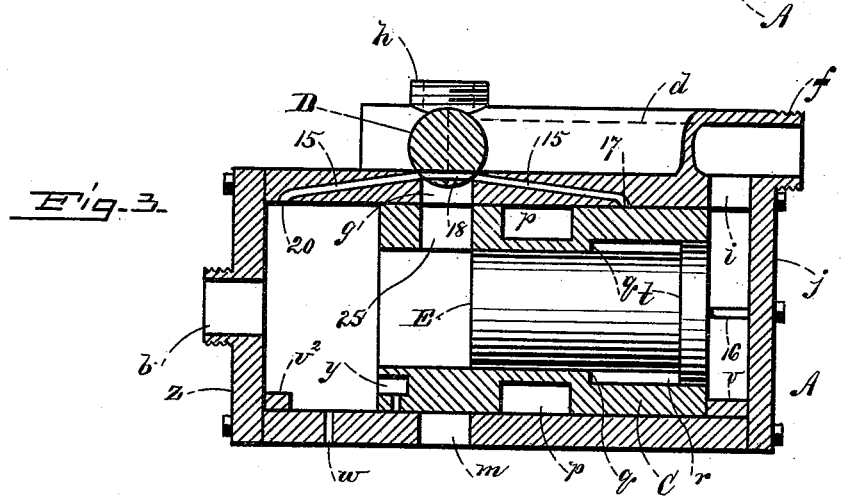
Fig. 3.
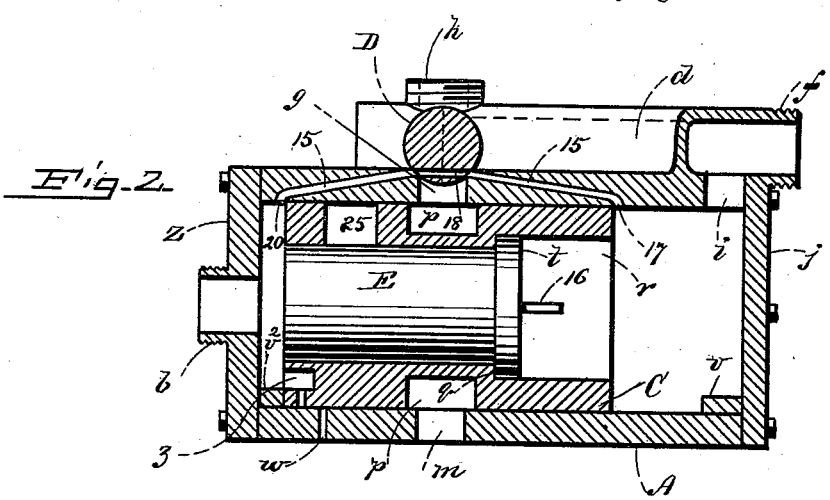
Fig. 2.
Fig. 4.
WITNESSES:
INVENTOR:
James D. Callahan,
PER C. A. Shawler,
ATTYS.

UNITED STATES PATENT OFFICE.

JAMES D. CALLAHAN, OF BOSTON, MASSACHUSETTS.

AUTOMATIC VALVE FOR AIR-BRAKES.

SPECIFICATION forming part of Letters Patent No. 431,506, dated July 1, 1890.

Application filed April 23, 1890. Serial No. 349,120. (No model.)

*To all whom it may concern:*

Be it known that I, JAMES D. CALLAHAN, of Boston, in the county of Suffolk, State of Massachusetts, have invented certain new and useful Improvements in Automatic Valves for Air-Brakes, of which the following is a description sufficiently full, clear, and exact to enable any person skilled in the art or science to which said invention appertains to make and use the same, reference being had to the accompanying drawings, forming part of this specification, in which—

Figure 1 is a top plan view of my improved valve; Fig. 2, a vertical transverse section taken on line $xx$ in Fig. 1, the valve being shown with the parts in the position assumed when the brakes are off; Fig. 3, a like view showing the position of the valve when the brakes are applied, and Fig. 4 an elevation of the auxiliary cock removed.

Like letters and figures of reference indicate corresponding parts in the different figures of the drawings.

My invention relates especially to valves for automatically governing the discharge of air from the auxiliary air-reservoir into the brake-cylinder of an air-brake mechanism; and it consists in certain novel features hereinafter fully set forth and claimed, the object being to produce a simpler, cheaper, and more effective device of this character than is now in ordinary use.

The nature and operation of the improvement will be readily understood by all conversant with such matters from the following explanation.

In the drawings, A represents the body or case of the valve, said body being preferably cylindrical in form and provided in one head with a threaded opening or nipple $b$, to which a pipe leading to the auxiliary air-reservoir may be secured. On the top of said cylinder a longitudinally-arranged chest or compartment $d$ is formed, its mouth or outer end being threaded at $f$ to receive the main brake-pipe leading from the locomotive. An opening is formed in the top of the chest near the inner end and has an exteriorly-threaded nipple $h$ to receive a pipe leading to the brake-cylinder. Directly below the nipple $h$ an opening $g$ is formed in the wall of the cylinder, leading into said chest. A similar opening or air-duct $i$ is formed in the cylinder near its head $j$ and adjacent to the chest-mouth. A two-way cock D, having a handle $k$, is disposed transversely in the chest $d$ below the nipple $h$, said cock being fitted to close the chest from said nipple and form a passage from the nipple to the duct $g$, or to close said duct and form a passage between the nipple and chest. Said cock is also fitted to conjointly close the chest and duct, cutting off the valve from the brake-cylinder. An exhaust-port $m$ is formed in the cylinder-wall opposite the port $g$ and in alignment therewith. A cylindrical main valve C is fitted to slide in the body A and is provided centrally with an annular groove or duct $p$, adapted to register with the ports $g\ m$. One end of the cylindrical valve is enlarged interiorly at $r$, forming an annular shoulder $q$. A port 25 is formed in said valve in position to register with the port $g$ when said valve is driven toward the head $j$, as hereinafter described.

A supplemental valve E, circular in cross-section, is fitted to slide tightly in the main valve and provided with an annular flange $t$ at one end, which works in the enlarged mouth $r$ of said main valve and is adapted to engage the shoulder $q$. When so engaged, the opposite ends of said valves are flush, as shown in Fig. 2.

Stops $v\ v^2$ are disposed in the opposite ends of the body to engage the main valve and stop its longitudinal movements at a determined distance from the cylinder-heads $j\ z$.

An arm 16 projects centrally from the head of the valve E in position to engage the cylinder-head $j$ and stop said valve conjointly with the main valve.

A small exhaust-port $w$ is formed in the body A, and a similar port or duct $y$, formed in the body of the main valve at the end adjacent to the cylinder-head $z$, is adapted to register therewith. Said exhaust is designed to equalize the air-pressure on the valves and prevent accidental movement thereof when the pressure in the main brake-pipe is reduced through leakage.

A longitudinally-arranged curved feed-duct 15 is formed in the upper wall of the body A beside the chest $d$, said duct opening into the port $g$, and its mouth 17 and 20 opening into the interior of the body A. The distance between the mouths of the ducts is slightly greater than the length of the main valve C, as shown in Fig. 2.

A duct 18 in the cock D registers with the duct 15 and forms a continuous air-passage across the port $g$ when the groove or opening 19 of said cock is disposed as shown in the drawings, the mouth of the chest $d$ being closed and the nipple $h$ and port $g$ connected thereby.

When the brakes are off, the pressure of air from the main brake-pipe passes into the chest $d$ and through the port $i$ into the body A, the valves being in the position shown in Fig. 2. The air in the brake-cylinder connected with the nipple $h$ has exhausted through the cock D, which is shown in its normal position, thence through port $g$, groove $p$, and port $m$ in the body A. The valves in this position are arranged between the mouths 17 and 20 of the feed-duct 15, and the air from the main brake-pipe passes through said feed out through the nipple $b$, and is thus continuously stored in the auxiliary reservoir connected therewith until the pressure of air at each end of the valve is equal.

When it is desired to apply the brakes, the air is permitted to escape from the main brake-pipe, reducing the pressure on the corresponding ends of the valves C E. The pressure on said valves at the reservoir end being then the greater causes them to advance conjointly toward the cylinder-head $j$. The body of the valve C as it begins to advance closes the mouth 17 of the feed-duct 15 and prevents the escape of air from the auxiliary reservoir therethrough. When said valve meets the stop $v$, its port 25 registers with the port $g$ and the exhaust $m$ is closed. The valve E then commences to advance until its arm 16 engages the cylinder-head $j$, thereby opening the port 25, as shown in Fig. 3. The air from the reservoir passes directly through the ports 25 and $g$ and through the open cock D into the brake-cylinder, applying the brakes in the usual manner. To release the brakes, pressure is again applied in the main brake-pipe, driving the valve E back until its flange $t$ meets the shoulder $q$ and closing the port 25. The valves C E then move conjointly until the stop $v^2$ is met and the exhaust $m$ connected again with the brake-cylinder.

Should a leak accidentally occur in the main brake-pipe, slightly reducing the pressure, the valves will be moved by the pressure from the reservoir until the duct $y$ in the valve C registers with the vent or supplemental exhaust-port $w$ in the body A, which will relieve the reservoir-pressure sufficiently to render it equal with that in the main pipe. Said movement of the valves is only sufficient to close the mouth 17 of the feed-duct and prevent air passing into the reservoir.

Having thus explained my invention, what I claim is—

1. In a valve of the character described, a cylindrical body having an exhaust-port and ports leading, respectively, to the main brake-pipe, auxiliary reservoir, and brake-cylinder, a cylindrical sliding main valve therein having a duct connecting the brake-cylinder port and exhaust when the brake is off, and a port adapted to register with the brake-port when said brake is on, a feed-duct in the body-wall for supplying the auxiliary reservoir, and a valve sliding in the main valve and adapted to close its port, substantially as described.

2. In a valve of the character described, a body provided with ports leading, respectively, to the main brake-pipe, auxiliary reservoir, and brake-cylinder, a sliding valve in said body provided with a supply-port and an exhaust-port adapted to register with the brake-cylinder port, a supply-duct in a wall of said body connecting the main brake-pipe and auxiliary reservoir when pressure is on in said brake-pipe and closed by said valve when said pressure is reduced, substantially as described.

3. The body A, provided with the ports $g$ $i$ $b$, exhaust $m$, and feed-duct 15, combined with the sliding valve C, having the ports $p$ and 25, arranged to operate substantially as described.

4. In a valve of the character described, a body connected with the main brake-pipe, auxiliary reservoir, and brake-cylinder, a feed-duct in the wall thereof disposed in position to connect the brake-pipe and said auxiliary reservoir, and independent sliding valves, as C E, in said body fitted to conjointly exhaust from the brake-cylinder and open said duct when the pressure is on in the brake-pipe, and conjointly closing the feed and admitting air from the auxiliary reservoir to the brake-cylinder when said pressure is reduced, substantially as described.

5. In a valve of the character described, the combination of a body, an air-chamber opening into the body and adapted to be connected with the main brake-pipe, a port leading through said body and chamber to the brake-cylinder, a cock in said port provided with a duct registering with a feed-duct in the body-wall, and a sliding valve conjointly closing the brake-cylinder port and opening said feed, substantially as described.

6. In a valve of the character described, a feed-duct for the auxiliary reservoir formed in the body-wall and extending across the brake-cylinder port, combined with a two-way cock in said port, having a duct adapted to register with said feed when the port is open, substantially as set forth.

7. In a valve of the character described, a supplemental exhaust-port in the valve-body, and a duct in the sliding valve adapted to resister therewith and relieve the pressure from the auxiliary reservoir when the pressure in the main pipe is accidentally reduced, substantially as described.

8. In a device of the character described, a body provided with ports for connecting it with the main brake-pipe, brake-cylinder, and auxiliary reservoir, an exhaust in alignment with the brake-cylinder port, a feed-duct in the body-wall for said auxiliary reservoir, a sliding valve having a duct fitted to connect the brake-cylinder port and exhaust, and a port adapted to register with said brake-port, and a supplemental sliding valve adapted to close said valve-port, substantially as and for the purpose set forth.

9. The body A, provided with the ports $g$ $i$ $b$, exhaust $m$, and feed-ducts 15, in combination with the sliding valve C, having ports $p$ and 25, and the valve E, arranged to operate substantially as described.

JAMES D. CALLAHAN.

Witnesses:
O. M. SHAW,
K. DURFEE.